United States Patent
Geraci

(10) Patent No.: US 8,949,843 B2
(45) Date of Patent: Feb. 3, 2015

(54) MULTICORE PROCESSOR SYSTEM FOR CARRYING OUT PARALLEL PROCESSING OF TASKS IN A CLIENT USING PROCESSOR CORES PROVIDED IN THE CLIENT

(75) Inventor: James Geraci, Tokyo (JP)

(73) Assignee: Kabushiki Kaisha Enix, Tokyo (JP)

( * ) Notice: Subject to any disclaimer, the term of this patent is extended or adjusted under 35 U.S.C. 154(b) by 413 days.

(21) Appl. No.: 12/880,644

(22) Filed: Sep. 13, 2010

(65) Prior Publication Data

US 2011/0131583 A1    Jun. 2, 2011

Related U.S. Application Data

(60) Provisional application No. 61/272,386, filed on Sep. 18, 2009, provisional application No. 61/282,504, filed on Feb. 22, 2010.

(51) Int. Cl.
G06F 9/46       (2006.01)
G06F 15/173   (2006.01)
G06F 9/50       (2006.01)

(52) U.S. Cl.
CPC .............. G06F 9/505 (2013.01); G06F 9/5066 (2013.01); G06F 9/5083 (2013.01); G06F 2209/5017 (2013.01); G06F 2209/5021 (2013.01); G06F 2209/5022 (2013.01)
USPC ............ 718/104; 718/103; 718/100; 709/226

(58) Field of Classification Search
None
See application file for complete search history.

(56) References Cited

U.S. PATENT DOCUMENTS

| | | | | |
|---|---|---|---|---|
| 7,441,241 | B2 * | 10/2008 | Dawson et al. | 718/102 |
| 8,060,610 | B1 * | 11/2011 | Herington | 718/104 |
| 2002/0161891 | A1 * | 10/2002 | Higuchi et al. | 709/226 |
| 2006/0090161 | A1 * | 4/2006 | Bodas et al. | 718/100 |
| 2009/0049443 | A1 | 2/2009 | Powers et al. | |
| 2009/0083746 | A1 | 3/2009 | Katsumata | |

FOREIGN PATENT DOCUMENTS

| | | |
|---|---|---|
| JP | 11-205493 | 7/1999 |
| JP | 2008-305317 | 12/2008 |
| JP | 2009-75956 | 4/2009 |

OTHER PUBLICATIONS

Naik V .K. et al., "Performance analysis of job scheduling policies in parallel supercomputing environments", Supercomputing '93, Proceedings, pp. 824-832 (Nov. 1993).
Susanne M. Balle et al., "Enhancing an Open Source Resource Manager with Multi-core/Multi-threaded Support", Job Scheduling Strategies for Parallel Processing, pp. 37-50 (Jun. 2007).
Japan Office action, dated Apr. 17, 2012 along with an english translation thereof.

* cited by examiner

*Primary Examiner* — Meng An
*Assistant Examiner* — Bing Zhao
(74) *Attorney, Agent, or Firm* — Greenblum & Bernstein P.L.C.

(57) ABSTRACT

A multicore processor system includes one or more client carrying out parallel processing of tasks by means of processor cores and a server assisting the client to carry out the parallel processing via a communication network. Task information containing the minimum number of required cores indicating the number of processor cores required to carry out processes of the tasks and core information containing operation setup information indicating operation setup content of the processor cores are stored in the server. The server determines whether the task is allocated to the plurality of processor cores or not in accordance with the task information and the core information. The server updates the core information in accordance with a determination result to transmit the updated core information to the client. The client carries out the parallel processing by means of the processor cores in accordance with the received core information.

13 Claims, 5 Drawing Sheets

FIG. 2

TASK INFORMATION

| TASK ID | PRIORITY | MINIMUM NUMBER OF REQUIRED CORES | ... |
|---|---|---|---|
| TASK A | 1 | 2 | ... |
| TASK B | 2 | 2 | ... |
| TASK C | 3 | 1 | ... |
| TASK D | 4 | 1 | ... |
| TASK E | 5 | 1 | ... |
| ⋮ | ⋮ | ⋮ | ⋮ |

FIG. 3

CORE INFORMATION

| CLIENT ID | CORE ID | OPERATION SETUP CONTENT | INTERRUPTED TASK | WAITING TASK |
|---|---|---|---|---|
| 001 | CORE 0 | TASK B | – | – |
| | CORE 1 | TASK B | | |
| | CORE 2 | TASK B | | |
| | CORE 3 | TASK B | | |
| 002 | CORE 10 | WAITING | – | – |
| | CORE 11 | WAITING | | |
| ⋮ | ⋮ | ⋮ | ⋮ | ⋮ |

FIG. 4A

| CLIENT ID | CORE ID | OPERATION SETUP CONTENT | INTERRUPTED TASK | WAITING TASK |
|---|---|---|---|---|
| 001 | CORE 0 | TASK B | - | - |
| | CORE 1 | TASK B | | |
| | CORE 2 | TASK B | | |
| | CORE 3 | TASK B | | |

FIG. 4B

| CLIENT ID | CORE ID | OPERATION SETUP CONTENT | INTERRUPTED TASK | WAITING TASK |
|---|---|---|---|---|
| 001 | CORE 0 | TASK B | - | - |
| | CORE 1 | TASK B | | |
| | CORE 2 | TASK B | | |
| | CORE 3 | TASK C | | |

FIG. 4C

| CLIENT ID | CORE ID | OPERATION SETUP CONTENT | INTERRUPTED TASK | WAITING TASK |
|---|---|---|---|---|
| 001 | CORE 0 | TASK B | TASK C | - |
| | CORE 1 | TASK B | | |
| | CORE 2 | TASK A | | |
| | CORE 3 | TASK A | | |

MULTICORE PROCESSOR SYSTEM FOR CARRYING OUT PARALLEL PROCESSING OF TASKS IN A CLIENT USING PROCESSOR CORES PROVIDED IN THE CLIENT

CROSS-REFERENCE TO RELATED APPLICATION

The present application claims the benefit of U.S. Provisional Patent Application No. 61/272,386, filed on Sep. 18, 2009, and U.S. Provisional Patent Application No. 61/282,504, filed on Feb. 22, 2010, all of which are expressly incorporated herein by reference in their entirety.

BACKGROUND OF THE INVENTION

1. Field of the Invention

The present invention relates to a multicore processor system including one or more client that carries out parallel processing of tasks by means of a plurality of processor cores and a server that assists each of the one or more client to carry out the parallel processing via a communication network.

2. Description of the Related Art

Heretofore, a multicore processor system composed of two or more processor cores has been known. The multicore processor system can improve a processing performance (or processing efficiency) by sharing processes between the respective processor cores (hereinafter, also referred to simply as "cores").

As such a multicore processor system, for example, there has been proposed one wherein in the case where an error (or abnormality) is detected in any processor core, which is carrying out a process of a task with high priority, any of the other cores constituting the multicore processor system is caused to alternately carry out the task allocated to the processor core in which the error (or abnormality) has been detected (see Japanese Patent Application Publication No. 2008-305317, for example).

In such a conventional multicore processor system, allocation of a task with high priority causes a process of a task, which has been carried out until then, to be interrupted. Further, an upper limit for the number of cores that can be used for parallel processing of tasks may be provided in accordance with a configuration of tasks (that is, parallelism of programs).

In such a case, some cores may become a waiting state (that is, state where they are not carrying out a process of any task) until a process of a task with high priority is terminated. Thus, there has been a problem that an overall processing efficiency of the multicore processor system is deteriorated. Namely, there has been a problem that priority processing of the task with high priority finally causes time required for termination of all tasks to be increased.

SUMMARY OF THE INVENTION

It is an object of the present invention to provide a multicore processor system capable of improving a processing efficiency of tasks by means of a multicore processor.

In order to achieve the above object, the present invention is directed to a multicore processor system. The multicore processor system according to the present invention includes one or more client and a server. In this case, each of the one or more client(s) carries out parallel processing of tasks by means of a plurality of processor cores, and the server assists the client to carry out the parallel processing via a communication network.

The server includes a task information memory for storing task information, the task information containing the minimum number of required cores indicating the number of processor cores minimum required to carry out a process of the task.

The server also includes a core information memory for storing core information, the core information containing operation setup information indicating operation setup content of the processor cores.

The server also includes a task allocation determiner for determining whether the task is to be allocated to the plurality of processor cores or not in accordance with the task information and the core information.

The server also includes a core information updater for updating the core information in accordance with a determination result by the task allocation determiner.

The server also includes a core information transmitter for transmitting the core information updated by the core information updater to the client.

On the other hand, the client includes a core information receiver for receiving the core information transmitted by the core information transmitter of the server.

The client also includes a parallel processing executor for carrying out parallel processing of the tasks by means of the plurality of processor cores in accordance with the core information received by the core information receiver.

By configuring the multicore processor system as described above, it is possible to improve a processing efficiency of tasks by means of a multicore processor.

In the multicore processor system of the present invention, it is preferable that the client further includes: a process request receiver for receiving a request to carry out the process of the task; and a process information transmitter for transmitting process information to the server, the process information containing information on the requested task received by the process request receiver, and the server further includes: a process information receiver for receiving the process information transmitted by the process information transmitter of the client; and a task information updater for updating the task information in accordance with the process information received by the process information receiver. In this case, the task allocation determiner may determine whether the requested task is to be allocated to one or more processor core or not in accordance with the task information updated by the task information updater.

In the multicore processor system of the present invention, it is preferable that the task information contains priority indicating process priority for each task, wherein the task allocation determiner includes a processing task specifier that refers to the core information to specify a task in processing, which is a task that has been allocated to each of the plurality of processor cores, and the task allocation determiner compares priority of the processing task specified by the processing task specifier with priority of the requested task to determine that the task with higher priority is to be allocated to the processor cores.

In the multicore processor system of the present invention, it is preferable that the task allocation determiner includes: a required core number calculator for calculating the number of required cores by adding the minimum number of required cores for the requested task to the minimum number of required cores for the processing task; and a required core number determiner for determining whether or not the number of required cores calculated by the required core number calculator is a total number of the processor cores of the client or less, wherein, in the case where the required core number determiner determines that the number of required cores is the total number of the processor cores of the client or less, the task allocation determiner determines that the processing task and the requested task are allocated to the processor cores again.

In the multicore processor system of the present invention, it is preferable that the processing task specifier specifies a processing task that has been allocated to the processor cores more than the minimum number of required cores for the corresponding task of the processing tasks in the case where the required core number determiner determines that the number of required cores is the total number of the processor cores of the client or less, wherein the task allocation determiner determines that the number of cores, to which the processing task specified by the processing task specifier is to be allocated, is to be reduced or can be reduced in a range to the minimum number of required cores for the processing task specified by the processing task specifier.

According to the present invention, it is possible to improve a processing efficiency of tasks by means of a multicore processor.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 2 is an explanatory drawing showing an example of a storage state of task information;

FIG. 3 is an explanatory drawing showing an example of a storage state of core information;

FIGS. 4A to 4C are explanatory drawings for explaining a relationship between clients and core information;

DETAILED DESCRIPTION OF THE INVENTION

Hereinafter, one embodiment of the present invention will be described with reference to the appending drawings.

Figure 1:
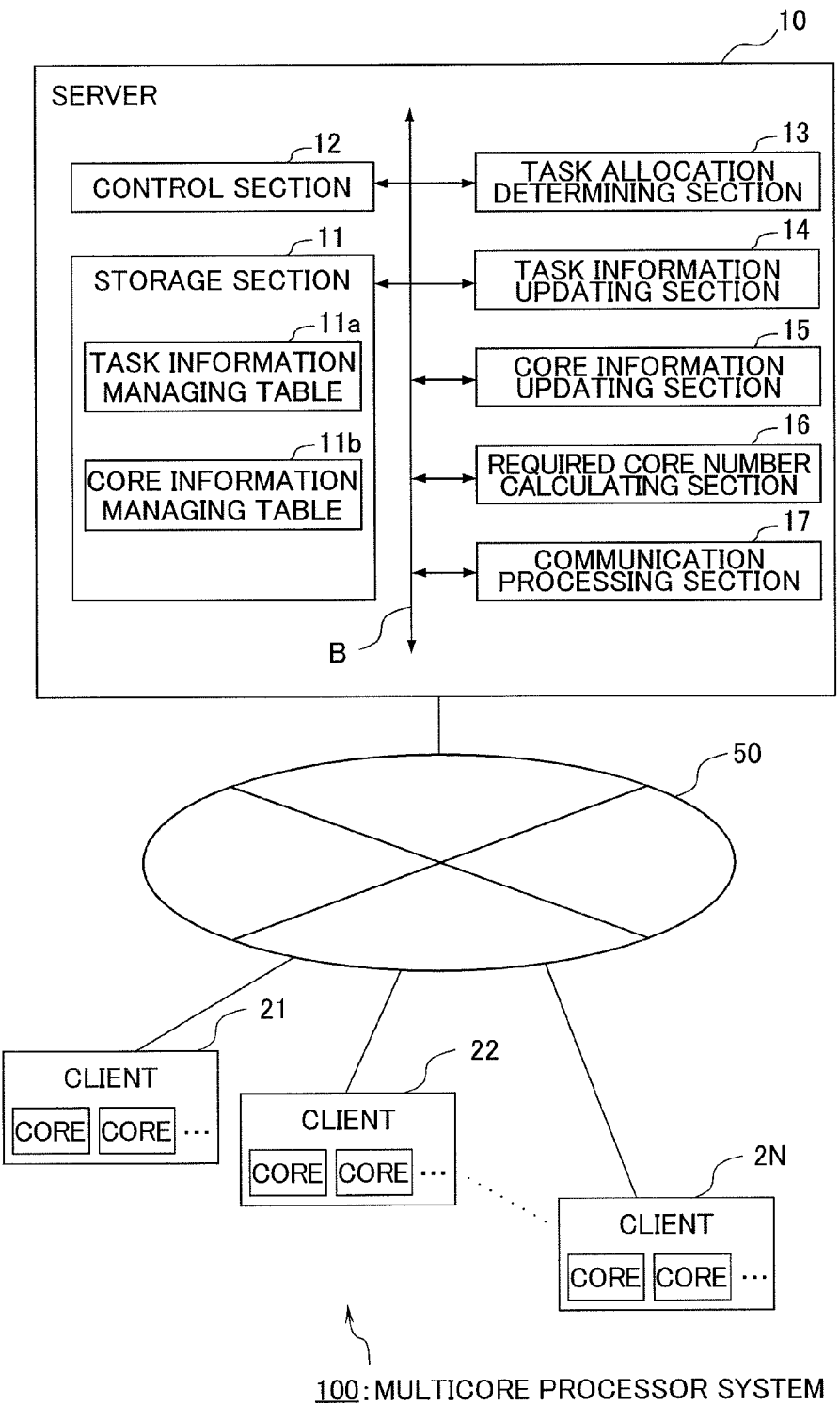
FIG. 1 is a block diagram showing a configuration example of a multicore processor system according to one embodiment of the present invention.

FIG. 1 is a block diagram showing a configuration example of a multicore processor system 100 according to one embodiment of the present invention. As shown in FIG. 1, the multicore processor system 100 includes a server 10, and a plurality of clients 21 to 2N (here, "N" is an arbitrary positive integer) each of which functions as a multicore processor.

In the present embodiment, the server 10 is connected to each of the clients 21 to 2N via a communication network 50 such as the Internet.

The server 10 is managed by a system administrator of the present system (for example, the multicore processor system 100), and is configured by an information processing device such as a WWW server. This server 10 has various functions to assist each of the clients 21 to 2N to carry out various kinds of information processing.

In the present embodiment, the server 10 includes: a storage section 11; a control section 12; a task allocation determining section 13; a task information updating section 14; a core information updating section 15; a required core number calculating section 16; and a communication processing section 17.

The storage section 11 is a storage medium for storing various kinds of information (or data). A task information managing table 11a and a core information managing table 11b are stored in the storage section 11.

The task information managing table 11a is a table for storing task information that is information on various tasks to be carried out their processes in each of the clients 21 to 2N. Here, the task means an executable unit of a process when viewed from an Operating System, OS. Further, in the present embodiment, the language "allocate tasks among a plurality of cores" means that processes and threads, each of which is a process unit constituting tasks, are allocated to the respective cores.

FIG. 2 is an explanatory drawing showing an example of a storage state of the task information in the task information managing table 11a. As shown in FIG. 2, the task information contains a task ID for uniquely specifying a task, priority, and the minimum number of required cores for each task.

Here, the "priority" means process priority of each task. The higher priority the task has (in the present embodiment, the lower a numeral value indicating priority of the task is), the more preferentially the task is required to carry out its process compared with other tasks. Further, the "minimum number of required cores" means the number of cores minimum required to carry out a process of each of the tasks appropriately. In the present embodiment, the minimum number of required cores is setup (or defined) for every task in advance. In this regard, an upper limit (the maximum number of cores) of the number of cores that can be utilized to carry out a process of a task and an indicator for indicating that the process of the task can be carried out by means of only the number of cores defined in advance (for example, information indicating that it is a task whose process can be carried out by means of only combination of two or four cores) may be included as the task information.

The core information managing table 11b is a table for storing core information that is information on cores included in each of the clients 21 to 2N. In the present embodiment, the core information is operation setup information indicating operation setup content of the cores of each client (for example, a task ID for specifying a task whose process is carried out by cores, information indicating that any core is in a waiting state, and the like).

FIG. 3 is an explanatory drawing showing an example of a storage state of the core information in the core information managing table 11b. As shown in FIG. 3, the core information contains client IDs for uniquely specifying the clients, interrupted task(s), waiting task(s), core IDs for specifying cores included by each of the clients, and the operation setup content of each core. In this regard, the interrupted task or waiting task is a task that is not allocated to the cores.

Here, the "interrupted task" means a task whose process is interrupted by receiving a request to carry out a task with higher priority than that of the task in processing when the process of the processing task is carried out by means of the respective cores of each of the clients 21 to 2N. Further, the "waiting task" means a task in which its process is not started and the task is in a waiting state because there are no allocatable cores when each of the clients 21 to 2N receives the request to carry out the task. In this regard, a task that is not allocated to cores is managed so as to be associated with the order to be allocated to the cores in accordance with priority of each of the tasks. In this case, a task managed as the interrupted task may be configured so that its priority is heightened on the basis of predetermined rules, for example. By configuring the multicore processor system 100 so that a process of an interrupted task tends to be carried out in priority to a waiting task, it is possible to prevent information stored in a cash memory from being increased excessively.

The control section 12 is configured by a central processing unit and a temporary storage section. The control section 12 has a function to control the respective sections included in the server 10 in accordance with various kinds of programs stored in the storage section 11, and a function to carry out various processes including a core information utilizing process and a task allocating process (will be described later).

The task allocation determining section 13 has a function to determine how various tasks, including a task in processing (processing task) and a requested task, are to be allocated to cores when to create and update the core information for each of the clients 21 to 2N. A method of allocating tasks to the cores will be described later in detail as the task allocating process (see FIG. 6). Here, the "processing task" means a task that has already been allocated to the cores in the core information. Further, the "requested task" means a task for which a request to carry out is received by each of the clients 21 to 2N.

The task information updating section 14 has a function to update the task information stored in the task information managing table 11a in accordance with information received from each of the clients 21 to 2N. The core information updating section 15 also has a function to update the core information stored in the core information managing table 11b in accordance with information received from each of the clients 21 to 2N.

The required core number calculating section 16 has a function to calculate the number of required cores in the task allocating process (will be described later). Here, "the number of required cores" means a numerical value indicating a sum of the minimum number of required cores for a processing task and the minimum number of required cores for a requested task.

The communication processing section 17 has a function to communicate with each of the clients 21 to 2N via the communication network 50.

Each of the clients 21 to 2N is an information processing device managed by a user thereof, and means a multicore processor having a plurality of processor cores (cores). Each of the clients 21 to 2N has various functions for realizing information processing (parallel processing of tasks) by means of the plurality of cores, such as a function (shared memory function) for sharing information between the respective cores.

FIGS. 4A to 4C are explanatory drawings for explaining a relationship between the clients 21 to 2N and the core information managed in the core information managing table 11b stored in the storage section 11 of the server 10. Here, a state where core information for one client 21 is changing will be described.

In the case where the client 21, which is an object of management, includes four cores (Cores 0, 1, 2, 3), the core information indicating tasks to be allocated to each of the four cores is set up in the core information managing table 11b. Here, transition of the core information due to the time course from the time when the task B is allocated to all of the four Cores 0, 1, 2, 3 included in the client 21 (see FIG. 4A) will be described.

In the case where the client 21 receives a request to carry out other task during processing of the task B, the server 10 updates the core information for the client 21 set up in the core information managing table 11b in accordance with a result of a task allocating process (see FIG. 6, which will be described later) in core information managing table 11b.

Namely, for example, when the process of the task B is carried out by means of all of the cores included in the client 21, the client 21 receives a request to carry out a process of a task C in which its priority is lower than that of the task B and the minimum number of required cores is "1". In this case, on the basis of a task allocating process by the server 10, as shown in FIG. 4B, both tasks (that is, task B and task C) are allocated to the cores so that the process of each of the tasks B and C is carried out by means of the cores more than the minimum number of required cores for the corresponding task. In the present embodiment, the Cores 0, 1 and 2 carry out a process of the task B, and the Core 3 carries out a process of the task C.

Subsequently, in the case where the client 21 receives a task A in which its priority is higher than those of the task B and task C and the minimum number of required cores is "2" when to continue to carry out the processes of the task B and task C, on the basis of the task allocating process by the server 10, as shown in FIG. 4C, the task C having the lowest priority becomes an interrupted task, and the task A and task B are respectively allocated to every two cores, which meet the minimum number of required cores. In the present embodiment, the Cores 0, 1 carry out the process of the task B, and the Cores 2, 3 carry out a process of the task A.

In this regard, although it is not shown in the drawings, the following case is also assumed. Namely, for example, in the case where the client 21 receives a request to carry out a process of a task D whose priority is lower than those of the task A and task B when the task A and task B are allocated to the Cores 0, 1, 2, 3 included in the client 21, the task D is stored as a waiting task on the basis of the task allocating process by the server 10.

Next, an operation of the multicore processor system 100 according to the present embodiment will be described with reference to flowcharts of FIGS. 5 and 6. In this regard, the content of operations and processes that particularly bear no relationship to the present invention may be omitted.

Figure 5:
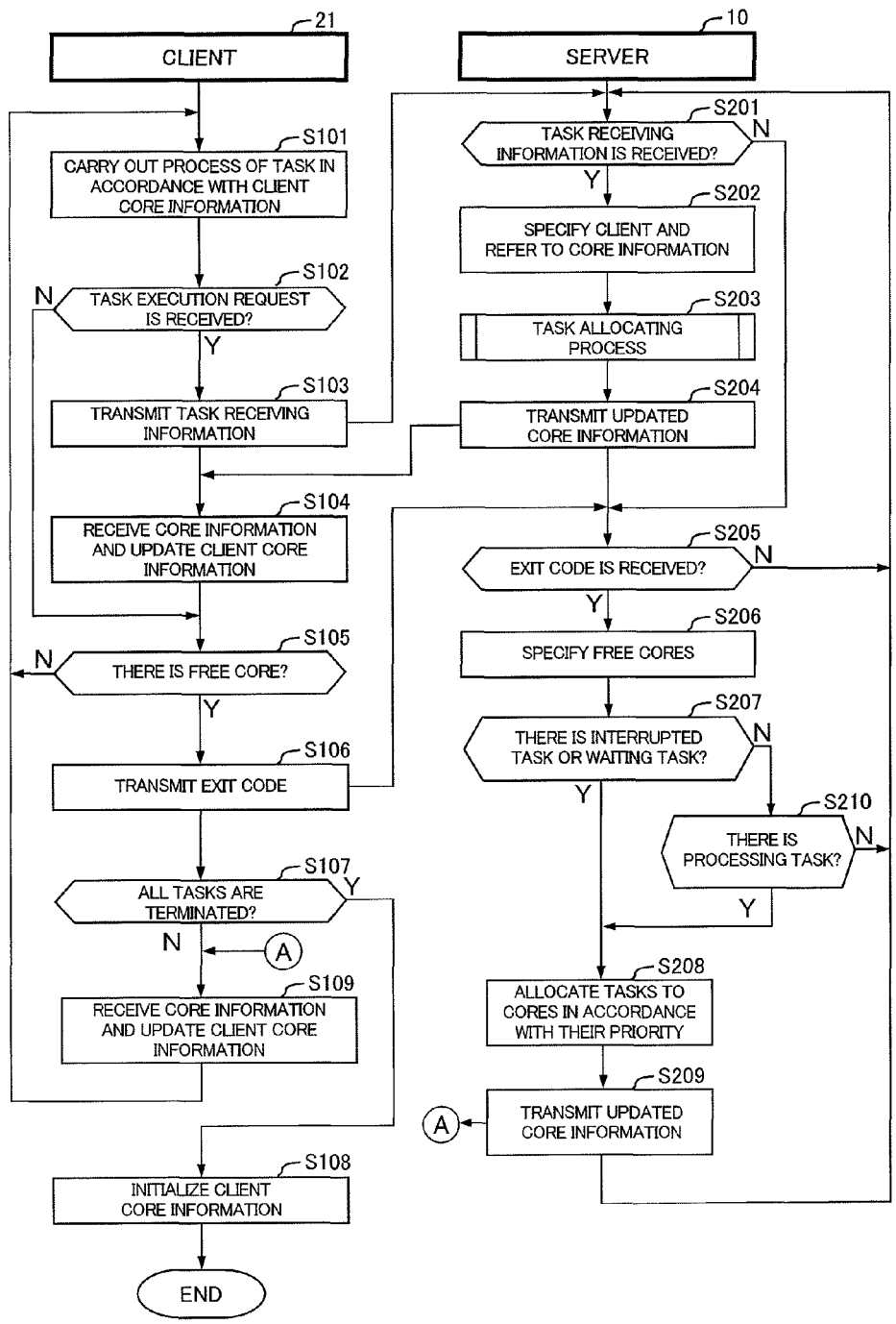
FIG. 5 is a flowchart showing an example of a core information utilizing process.

FIG. 5 is a flowchart showing an example of a core information utilizing process carried out by the multicore processor system 100. In the core information utilizing process, each of the clients 21 to 2N cooperates with the server 10 to carry out a process for realizing parallel processing of tasks. Operations of the client 21 and the server 10 in the present embodiment will be described.

In the core information utilizing process, the client 21 first carries out a process of a task in accordance with core information (client core information) stored in a memory of the client 21 (Step S101). In this regard, the client 21 may be configured so as to create client core information by converting the core information received from the server 10 in accordance with predetermined rules (for example, conversion of data format and the like). The client 21 may also be configured so that the core information received from the server 10 is set to the client core information without modification.

Subsequently, the client 21 determines whether a request to carry out a task (hereinafter, also referred to as "task execution request") is received or not (Step S102). Here, in the case where it is determined that no task execution request is received ("No" at Step S102), the processing flow for the client 21 shifts to Step S105 (will be described later).

On the other hand, for example, in the case where it is determined that a task execution request is received by receiving an operational input from the user ("Yes" at Step S102), the client 21 specifies the task indicated by the received task execution request (that is, requested task), and transmits, to the server 10, task receiving information containing a task ID, priority of the task and the minimum number of required cores according to the specified task (Step S103). In this regard, the client 21 presents its own client ID, for example, to the server 10 so that the server 10 is allowed to specify a source of the transmitted information, and transmits the task receiving information to the server 10.

Further, in the present embodiment, the client 21 includes a memory in which task managing information is stored. The process information contains: task IDs for uniquely specifying tasks whose processes can be carried out in the client 21; priority and the minimum number of required cores for each of the task IDs. In this regard, the client 21 may be configured so that priority of each of the tasks can be changed in accordance with an operational input from the user.

In this regard, the server 10 may be configured so as to contain the whole task managing information indicating priority of each task and the minimum number of required cores thereof. In this case, each of the clients 21 to 2N may be configured so as to transmit only a task ID indicating a task received as a request to carry out the task to the server 10 as the task receiving information.

On the other hand, in the core information utilizing process, the server 10 determines whether task receiving information is received or not (Step S201). In the case where it is determined that no task receiving information is received ("No" at Step S201), the processing flow for the client 21 shifts to Step S205 (will be described later). In the case where it is determined that the task receiving information is received from the client 21 ("Yes" at Step S201), the server 10 specifies the client 21 on the basis of the presented client ID, and refers to the core information for the client 21 (Step S202).

When the server 10 refers to the core information, the server 10 carries out a task allocating process for allocating the requested task to the cores included in the client 21 (Step S203).

After the task allocating process is carried out, the server 10 transmits the core information updated in the task allocating process to the client 21 (Step S204).

When the client 21 receives the core information from the server 10 to update the client core information (Step S104), the client 21 allocates the task to the cores in accordance with the updated client core information, and carries out a process of the task by means of the respective cores (Step S104).

When the process of the task allocated to the Cores 0, 1, 2 and 3 of the client 21 is terminated, the respective cores become a state (free core state) in which a task can newly be allocated to the cores. In the present embodiment, the client 21 refers to the client core information in response to termination of the task, and sets the cores, to which the terminated task was allocated, to free cores.

Next, the client 21 determines whether there is a free core of the Cores 0, 1, 2, 3 or not (Step S105). Here, in the case where it is determined that there is no free core ("No" at Step S105), the processing flow for the client 21 shifts to Step S101.

On the other hand, in the case where it is determined that there is a free core ("Yes" at Step S105), the client 21 transmits information (exit code) indicating a task whose process has been terminated and free core (s) to the server 10 (Step S106), and determines whether all of the tasks whose task execution requests are received are terminated or not (Step S107).

Here, in the case where it is determined that all of the tasks are terminated ("Yes" at Step S107), the client 21 initializes the client core information (Step S108), and this process is terminated.

On the other hand, in the case where it is determined that all of the tasks are not terminated ("No" at Step S107), the client 21 waits for transmission of the core information from the server 10. When the client 21 receives the core information, the client 21 updates the client core information (Step S109). The processing flow for the server 10 shifts to Step S101.

On the other hand, when the core information updated at Step S204 is transmitted (or, in the case where it is determined at Step S201 that the task receiving information is not received), the server 10 determines whether an exit code is received or not (Step S205). Here, in the case where it is determined that no exit code is received ("No" at Step S205), the processing flow for the server 10 shifts to Step S201.

On the other hand, in the case where it is determined that the exit code transmitted from the client 21 is received ("Yes" at Step S205), the server 10 specifies the free core(s) from the received exit code (Step S206).

When the free core(s) is/are specified, the server 10 refers to the core information, and determines whether or not there is an interrupted task or waiting task (Step S207). Here, in the case where it is determined that there is an interrupted task or waiting task ("Yes" at Step S207), the server 10 allocates the task to the cores in accordance with priority of each of the tasks, whereby the core information is updated (Step S208). When the core information is updated, the server 10 transmits the updated core information to the client 21 (Step S209), and the processing flow for the server 10 shifts to Step S201.

On the other hand, in the case where it is determined that there is no interrupted task and waiting task ("No" at Step S207), the server 10 determines whether there is a task (processing task) which has already been allocated to the cores or not (Step S210). Here, in the case where it is determined that there is a processing task ("Yes" at Step S210), the processing flow for the server 10 shifts to Step S208, and the server 10 updates the core information so that the number of cores for carrying out a process of the task in processing is increased.

On the other hand, in the case where it is determined that there is no task in processing ("No" at Step S208), the processing flow for the server 10 shifts to Step S201. In this regard, when the server 10 terminates communication with the client 21, for example, the server 10 terminates the core information utilizing process.

Next, the task allocating process carried out by the server 10 will be described.

Figure 6:
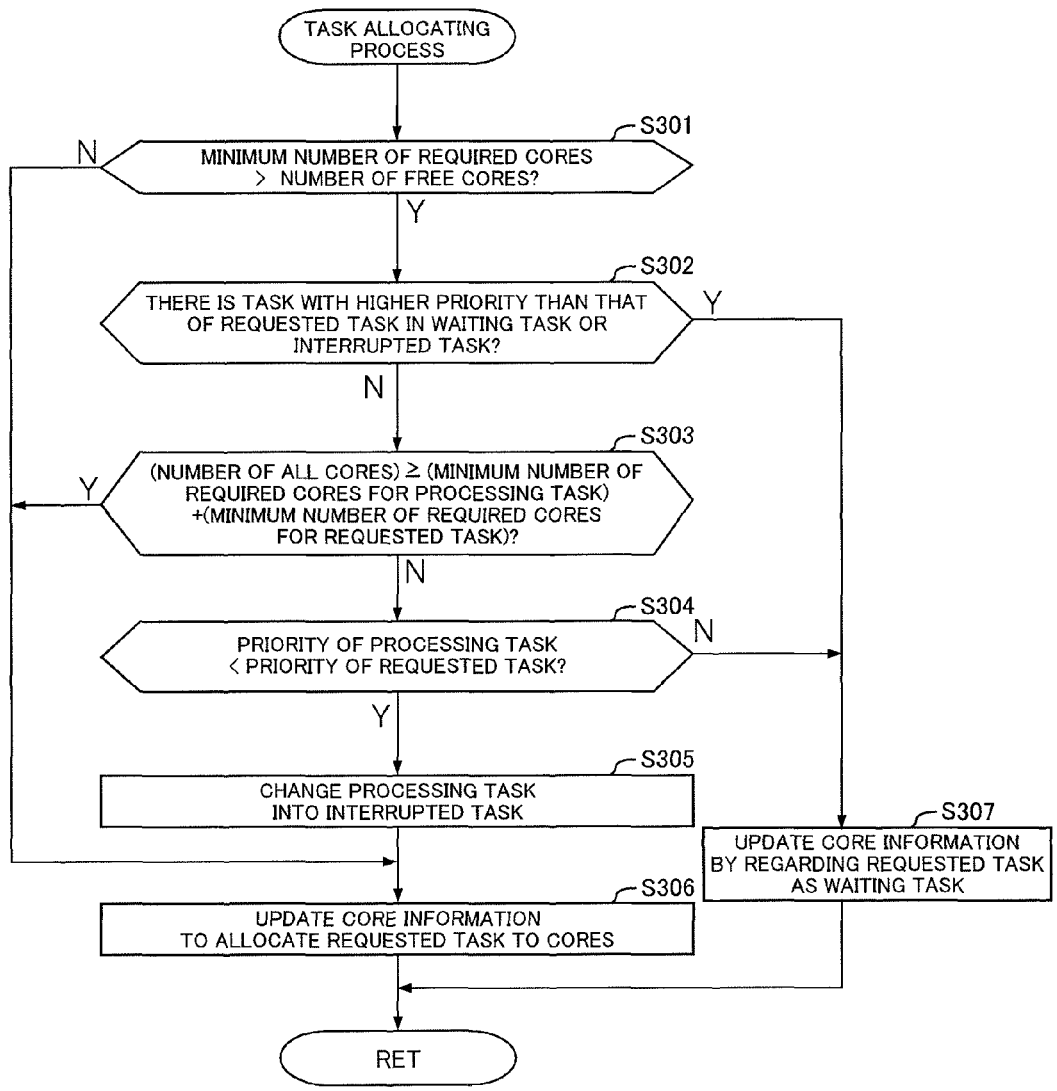
FIG. 6 is a flowchart showing an example of a task allocating process.

FIG. 6 is a flowchart showing an example of the task allocating process carried out by the server 10. In the task allocating process, a process to create (or update) the core information that each of the clients 21 to 2N utilizes to allocate a task to cores actually is carried out. Here, an operation of the server 10 against the client 21 will be described.

In the task allocating process, the server 10 first refers to the task information and the core information, and determines whether the minimum number of required cores for the requested task is more than the number of free cores of the client 21 or not (Step S301). Here, in the case where it is determined that the minimum number of required cores for the requested task is not more than the number of free cores ("No" at Step S301), the processing flow for the server 10 shifts to Step S306 (will be described later).

On the other hand, in the case where it is determined that the minimum number of required cores for the requested task is more than the number of free cores ("Yes" at Step S301), the server 10 refers to the core information, and determines whether there is a task with higher priority than that of the requested task in the tasks stored as the waiting task or interrupted task or not (Step S302). Here, in the case where it is determined that there is a task with higher priority than that of the requested task in the tasks stored as the waiting task or interrupted task ("Yes" at Step S302), the server 10 regards the requested task as a waiting task to update the core information (Step S307), and the processing flow shifts to Step S204 in the core information utilizing process (see FIG. 5).

On the other hand, in the case where it is determined that there is no task with higher priority than that of the requested task in the tasks stored as the waiting task or interrupted task ("No" at Step S302), the server 10 calculates the number of required cores by adding the minimum number of required cores for the processing task to the minimum number of required cores for the requested task. The server 10 then determines whether or not the number of required cores thus calculated is a total number of the processor cores of the client 21 (the number of all cores) or less (Step S303).

In the case where it is determined that the number of required cores thus calculated is the number of all cores of the client 21 or less ("Yes" at Step S303), the server 10 determines that the processing task and the requested task are to be allocated to the processor cores, and the processing flow shifts to Step S306 (will be described later).

On the other hand, in the case where it is determined that the number of required cores thus calculated is more than the number of all cores of the client 21 ("No" at Step S303), the server 10 refers to the task information, and determines whether the priority of the processing task is lower than the priority of the requested task or not (Step S304).

Here, in the case where it is determined that the priority of the processing task is not lower than the priority of the requested task ("No" at Step S304), the server 10 regards the requested task as a waiting task to update the core information (Step S307), and the processing flow shifts to Step S204 in the core information utilizing process.

On the other hand, in the case where it is determined that the priority of the processing task is lower than the priority of the requested task ("Yes" at Step S304), the server 10 changes the processing task to an interrupted task (Step S305). This causes free cores to be provided.

When the processing task is changed to the interrupted task, the server 10 determines that the requested task is to be allocated to the free cores, updates the core information (Step S306), and the processing flow shifts to Step S204 in the core information utilizing process.

In this regard, the server 10 updates the core information by changing the operation setup content in the core information as an object to be updated. Namely, the server 10 first allocates the requested task to free cores (that is, cores in which the operation setup content is empty). Then, in the case where free cores are fewer than the minimum number of required cores for the requested task, the cores to which the processing task is allocated are set to free cores, and the requested task is allocated to the free cores. In this case, the server 10 confirms at Step S303 that the number of all cores is the number of required cores or more. Therefore, it is possible to avoid a situation that the cores to which the processing task is allocated falls below the minimum number of required cores for the processing task.

Further, the server 10 may be configured so as to store a processing task and a requested task, and to carry out a process to allocate the processing task and the requested task to free cores again after all of the cores are set to the free cores once. Since the client 21 carries out the process of the task actually, it does not influence the process of the task even though the server 10 temporarily sets all of the cores in the core information for the client 21 to free cores.

In this regard, so long as a ratio between the number of cores to which the processing task is allocated and the number of cores to which the requested task is allocated falls in a range that meets the minimum number of required cores of each task, the ratio may be determined by means of any method. For example, the server 10 may be configured to determine the ratio in accordance with priority of each task, or the client 21 may be configured to carry out a process of the processing task in priority to the requested task.

Further, the server 10 may be configured so that the requested task is first allocated to free cores and the requested task is again allocated to the cores to which the processing task is allocated if needed. By configuring the server 10 in this manner, it becomes possible to suppress the number of times of processes required to cause the client 21 to stop the process by means of the processor cores carrying out the process of the processing task and to start a process of another task (that is, requested task) newly. As a result, it is possible to improve a processing efficiency of tasks.

Further, the server 10 may be configured so as to basically ensure only the predetermined number of free cores and to allocate the processing task and the requested task to the free cores. Namely, for example, in the case where the number of required cores, which is a sub of the minimum number of required cores for the processing task and the minimum number of required cores for the requested task, is less than the number of all cores of the client 21 by only one core and the process of the processing task can be carried out using one or more core than the minimum number of required cores, the client 21 may be configured to leave one free core in priority. By configuring the client 21 in this manner, for example, there is no need for the server 10 to cause the client 21 to provide free cores in the case where the task needs to be allocated to the other processor cores, such that any of the processor cores in the client 21 is broken down. For that reason, it becomes possible to deal with such an error as soon as possible.

As explained above, in the embodiment described above, the multicore processor system 100 includes: the one or more clients 21 to 2N each of which carries out parallel processing of tasks by means of the plurality of processor cores; and the server 10 that assists each of the clients 21 to 2N to carry out the parallel processing via the communication network 50. In this case, the server 10 is provided with the task information managing table 11a (task information memory) for storing the task information containing the minimum number of required cores that indicates the number of processor cores minimum required to carry out a process of the task (for example, tasks A to E), and the core information managing table 11b (core information memory) for storing the core information containing operation setup information indicating operation setup content of the processor cores (for example, a task ID for specifying a task whose process is carried out by the cores, information indicating that any core is in a waiting state, and the like). The server 10 determines whether the task is allocated to the plurality of processor cores (for example, Cores 0, 1, 2, 3) in accordance with the task information and the core information; updates the core information in accordance with the determination result; and transmits the updated core information to each of the clients 21 to 2N. Each of the clients 21 to 2N receives the core information transmitted from the server 10; and carries out the parallel processing of the tasks by means of the plurality of processor cores (for example, Cores 0, 1, 2, 3) in accordance with the received core information. Therefore, it is possible to improve a processing efficiency of the tasks by means of the multicore processor.

Namely, by configuring the multicore processor system 100 so as to provide the minimum number of required cores for tasks and allocate the tasks to the cores in accordance with these minimum numbers, it is possible to improve the overall processing efficiency compared with one in which a task with high priority simply interrupts a task in processing.

Further, in the multicore processor system 100 according to the embodiment described above, each of the clients 21 to 2N receives a request to carry out the process of the task, and transmits the process information containing the information on the received requested task (for example, the task receiving information) to the server 10. The server 10 receives the process information transmitted from each of the clients 21 to 2N; updates the task information in accordance with the received process information; and determines whether the requested task is to be allocated to one or more processor core (for example, Core 0, 1, 2, 3) or not in accordance with the updated task information. Therefore, since it is possible to allocate tasks to the processor cores in accordance with their operating conditions, it is possible to allocate the tasks to the cores efficiently in response to a request from a client (or a user of the client).

Further, in the multicore processor system 100 according to the embodiment described above, the task information contains priority indicating process priority for each task, and the server 10 refers to the core information to specify the processing task that is a task allocated to each of the plurality of processor cores (for example, Cores 0, 1, 2, 3), and compares the specified priority of the processing task with the priority of the requested task to determine that the task with higher priority is to be allocated to the processor cores. Therefore, it is possible to carry out a process of a task with higher process priority in priority to other tasks.

Further, in the multicore processor system 100 according to the embodiment described above, the server 10 calculates the number of required cores by adding the minimum number of required cores of the processing task to the minimum number of required cores of the requested task, and determines whether or not the number of required cores thus calculated is the total number of the processor cores (for example, Cores 0, 1, 2, 3 of the client 21) of each of the clients 21 to 2N or less. Further, in the case where it is determined that the number of required cores thus calculated is the total number of the processor cores of each of the clients 21 to 2N or less, the server 10 determines that the processing task and the requested task are to be allocated to the processor cores. Therefore, it is possible to reduce a possibility that some processor cores become a waiting state until termination of a process of other processor cores when processes of a plurality of tasks are carried out by parallel processing.

Namely, for example, in a situation in which four cores share and carry out a task B, the client 21 receives a request to carry out a process of a task A with higher priority than that of the task B. At this time, a conventional multicore processor first causes all of the four cores to interrupt the process of the task B, and refers to task information on the task A whose request to carry out the process is received. Then, for example, in the case where it is determined that the process of the task A is shared by up to two cores and can be carried out, the two cores start to carry out the process of the task A, and the remaining cores interrupt the process of the task B. For that reason, in the case where a process of the task with high priority is first to be carried out, an overall processing efficiency may be lowered.

On the other hand, in the embodiment described above, tasks can be allocated to the cores in view of the minimum number of required cores that is the number of cores of a minimum standard required for carrying out a process of each of the tasks. Therefore, in the case where a process of a task with high priority interrupts during processing of a task and a sum of the minimum numbers of required cores of the two tasks is the number of cores included in the multicore processor or less, the processes of the two tasks can be carried out at the same time. Therefore, by taking into consideration process priority of each task, it is possible to prevent a situation that an overall processing efficiency is deteriorated from occurring.

In this regard, in the embodiment described above, the multicore processor system 100 including the clients 21 to 2N each carrying out parallel processing of tasks by means of the plurality of processor cores and the server 10 assisting each of the clients 21 to 2N to carry out the parallel processing via the communication network 50 has been explained as an example. However, the subject to which the present invention is applied is not limited to a system in the form of server/client system. For example, the present invention can be applied to a system having both functions of the server 10 and functions of the client 21. Namely, the present invention may be applied to one in which the function of the server 10 to manage the plurality of processor cores is included in any of the clients 21 to 2N.

In this regard, although it has not been referred to particularly in the embodiment described above, the server 10 may be configured as follows. Namely, in the case where the server 10 determines that the number of required cores is the total number of the processor cores of the client 21 or less, the server 10 specifies the processing task that has been allocated to the processor cores more than the minimum number of required cores for the corresponding processing task of processing tasks, and determines that the number of cores, to which the specified processing task is to be allocated, is to be reduced or can be reduced in a range to the minimum number of required cores for the specified processing task. By configuring the server 10 in this manner, it becomes possible to prevent the number of cores for the processing task, which should not be reduced, from being reduced.

Namely, for example, the server 10 may be configured as follows. In the case where the server 10 determines that, in the task allocating process, the number of all cores is the number of required cores or more (see Step S303 of FIG. 6), the server 10 calculates a sum of the number of cores to which the processing task is allocated and the minimum number of required cores for the requested task (the number of total cores), and determines whether the number of total cores thus calculated exceeds the number of all cores of the client 21 or not. In the case where it is determined that the number of total cores exceeds the number of all cores of the client 21, it is determined that the number of cores to which the processing task is allocated needs to be reduced in the range that it is not less than the minimum number of required cores of the processing task. Then, the server 10 informs that effect of the client 21 before the processing task and the requested task are allocated to the processor cores of the client 21 again, and updates the core information in response to reception of an allocation instruction from the client 21.

By configuring the server 10 in this manner, the server 10 is allowed to inform of the client 21 that execution of the requested task causes the process of the processing task to become late. This makes it possible for the client 21 side to determine whether the process of the processing task is to be carried out in priority to the requested task or not.

According to the present invention, it is possible to improve a processing efficiency by a multicore processor system. Therefore, the present invention is industrial useful.

What is claimed is:

1. A multicore processor system comprising at least one client and a server, each of the at least one client including a plurality of processor cores therein and carrying out parallel processing of its own tasks submitted on the client using its own plurality of processor cores, the server assisting each of the at least one client to carry out the parallel processing of the tasks via a communication network, wherein the server comprises:
- a task information memory for storing task information, the task information containing a minimum number of required cores indicating a number of the plurality of processor cores minimally required to carry out task processing for each of the tasks to be carried out in each of the at least one client and a priority for each of the tasks;
- a core information memory for storing core information, the core information containing operation setup content of the plurality of processor cores of each of the at least one client, the operation setup content containing information on whether each of the plurality of processor cores in each of the at least one client is in a waiting state or an assigned state of any task;
- a task allocation determiner for determining to which of the plurality of processor cores in a corresponding client a predetermined task of the corresponding client's own tasks submitted on the client is to be allocated in accordance with the task information and the core information for the corresponding client, such that the predetermined task is first allocated to processor cores of the corresponding client that are in the waiting state and again allocated to processor cores of the correspond client that are in the assigned state of any task based on the minimum number of required cores and priorities of tasks of the corresponding client;
- a core information updater for updating the core information for the corresponding client in accordance with a determination result for the corresponding client determined by the task allocation determiner; and
- a core information transmitter for transmitting the core information for the corresponding client updated by the core information updater to the corresponding client after the core information updater updates the core information for the corresponding client, and wherein each of the at least one client comprises:
- a core information receiver for receiving the core information for the corresponding client transmitted by the core information transmitter of the server; and
- a parallel processing executor for carrying out the parallel processing of the tasks using the plurality of processor cores of the corresponding client in accordance with the core information for the corresponding client received by the core information receiver.

2. The multicore processor system as claimed in claim 1, wherein each of the at least one client further comprises:
- a process request receiver for receiving a request to carry out the task processing of the predetermined task from a user of the corresponding client; and
- a process information transmitter for transmitting process information to the server, the process information containing information on the predetermined task corresponding to the request received by the process request receiver, wherein the server further comprises:
- a process information receiver for receiving the process information transmitted by the process information transmitter of the corresponding client; and
- a task information updater for updating the task information of the corresponding client in accordance with the process information received by the process information receiver, and wherein the task allocation determiner determines to which of the plurality of processor cores in the corresponding client the predetermined task thus requested is to be allocated in accordance with the task information for the corresponding client updated by the task information updater and the core information for the corresponding client.

3. The multicore processor system as claimed in claim 2, wherein the task information contains priority indicating process priority for each of the tasks, and wherein the task allocation determiner includes a processing task specifier that refers to the core information to specify at least one task in processing, the at least one task in processing being a task that has already been allocated to at least one of the plurality of processor cores, and wherein the task allocation determiner compares a process priority of the at least one task specified by the processing task specifier with a process priority of the task corresponding to the request to determine that the task with a higher process priority that is to be allocated to the plurality of processor cores in the corresponding client.

4. The multicore processor system as claimed in claim 3, wherein the task allocation determiner includes:
- a required core number calculator for calculating the number of processor cores by adding the minimum number of required processor cores for the task corresponding to the request to the minimum number of required processor cores for the at least one task; and
- a required core number determiner for determining whether the number of required processor cores calculated by the required core number calculator is at most a total number of the plurality of processor cores of the corresponding client, wherein, when the required core number determiner determines that the number of required cores is at most the total number of the plurality of processor cores of the corresponding client, the task allocation determiner determines that the at least one task in processing and the task corresponding to the request are to be allocated to the plurality of processor cores of the corresponding client again.

5. The multicore processor system as claimed in claim 4, wherein the processing task specifier specifies a task in processing that has been allocated to the plurality of processor cores more than the minimum number of required cores for the corresponding task of the at least one task in processing when the required core number determiner determines that the number of required cores is at most the total number of the plurality of processor cores of the corresponding client, and wherein the task allocation determiner determines that the number of processor cores, to which the task in processing specified by the processing task specifier is to be allocated, is to be reduced or can be reduced in a range to the minimum number of required processor cores for the task in processing specified by the processing task specifier.

6. The multicore processor system as claimed in claim 1, wherein each of the at least one clients further comprises:

a client task termination determiner for determining whether the plurality of processor cores for the corresponding client to which the predetermined task was allocated are free cores;

a client core information updater for updating the core information for the corresponding client in accordance with a determination result for the corresponding client determined by the client task termination determiner; and a client core information transmitter for transmitting the core information for the corresponding client updated by the client core information updater to the server after the client core information updater updates the core information for the corresponding client.

7. The multicore processor system as claimed in claim 6, wherein the server further comprises:

a server core information receiver for receiving the core information for the corresponding client transmitted from the client core information transmitter for the corresponding client.

8. The multicore processor system as claimed in claim 1, wherein each of the at least one client determines free cores from among the plurality of processor cores of the corresponding client, and wherein each of the at least one client transmits exit code information of the free cores of the corresponding client to the server.

9. The multicore processor system as claimed in claim 8, wherein the core information updater of the server further updates the core information for the corresponding client in accordance with the exit code information of the free cores of the corresponding client.

10. The multicore processor system as claimed in claim 1, wherein each of the at least one client transmits exit information to the server which indicates when one of its own plurality of processor cores is in the waiting state.

11. The multicore processor system as claimed in claim 10, wherein each of the at least one client transmits the exit information to the server in response to a termination of the predetermined task.

12. The multicore processor system as claimed in claim 1, wherein the core information stored in the core information memory of the server includes core identifiers for specifying each of the plurality of processor cores included in each of the at least one client.

13. The multicore processor system as claimed in claim 12, wherein the core information stored in the core information memory of the server contains a client identifier for specifying each of the at least one client, and wherein the core identifiers of the plurality of processor cores for each of the at least one client are stored in association with the client identifier of each of the at least one client.

* * * * *